(12) United States Patent
Yang (10) Patent No.: US 9,396,406 B2
(45) Date of Patent: Jul. 19, 2016

(54) METHOD FOR RECOGNIZING AND LOCATING OBJECT

(71) Applicant: DELTA ELECTRONICS, INC., Taoyuan Hsien (TW)

(72) Inventor: Yuan-Hsiang Yang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 196 days.

(21) Appl. No.: 14/495,604

(22) Filed: Sep. 24, 2014

(65) Prior Publication Data

US 2015/0371102 A1 Dec. 24, 2015

(30) Foreign Application Priority Data

Jun. 18, 2014 (TW) .............................. 103121094 A (51) Int. Cl.
*G06K 9/00* (2006.01)
*G06K 9/32* (2006.01)
*G06T 7/00* (2006.01)
*G06T 7/20* (2006.01)

(52) U.S. Cl.
CPC .......... *G06K 9/3241* (2013.01); *G06K 9/00201* (2013.01); *G06K 9/3275* (2013.01); *G06T 7/0083* (2013.01); *G06T 7/2033* (2013.01)

(58) Field of Classification Search
CPC ............ G06K 9/3241; G06K 9/00201; G06K 9/3275; G06T 7/0083; G06T 7/2033
USPC ........................................................ 382/103
See application file for complete search history.

(56) References Cited

U.S. PATENT DOCUMENTS

| | | | | |
|---|---|---|---|---|
| 4,618,989 A | * | 10/1986 | Tsukune | G06K 9/4633 382/170 |
| 6,128,578 A | * | 10/2000 | Sakaino | G06T 7/2033 702/3 |
| 2008/0260238 A1 | * | 10/2008 | Pfister | G06K 9/00208 382/154 |
| 2010/0240996 A1 | * | 9/2010 | Ionasec | G06T 7/0016 600/443 |
| 2012/0082385 A1 | * | 4/2012 | Xu | G06K 9/6857 382/199 |
| 2015/0178592 A1 | * | 6/2015 | Ratcliff | H04N 5/23222 382/155 |

\* cited by examiner

*Primary Examiner* — Bhavesh Mehta
*Assistant Examiner* — Ian Lemieux
(74) *Attorney, Agent, or Firm* — Kirton McConkie; Evan R. Witt (57) ABSTRACT

A method for recognizing and locating an object includes an offline mode process and an online mode process. In the offline mode process, plural sampled edge points of a template image of the object and respective gradient angles and a gravity position of the plural sampled edge points are obtained, and plural similarity score tables are obtained according to the plural sampled edge points, a predetermined detecting distance range and a predetermined gradient angle difference range. In the online mode process, plural edge points of a live image and respective gradient angles are obtained, plural predictive gravity positions are calculated, and plural similarity scores corresponding to the plural predictive gravity positions are summed up. The predictive gravity position with the local maximum of the similarity scores higher than a threshold value is correlated with the gravity position of the template image so as to recognize and locate the object.

14 Claims, 10 Drawing Sheets

| 50 | 56 | 86 | 132 | 87 | 55 | 52 |
|----|----|----|-----|----|----|----|
| 52 | 81 | 143 | 149 | 145 | 80 | 51 |
| 81 | 145 | 146 | 148 | 146 | 145 | 81 |
| 98 | 144 | 147 | 149 | 148 | 145 | 97 |
| 55 | 87 | 145 | 147 | 149 | 81 | 51 |
| 51 | 80 | 144 | 150 | 146 | 82 | 52 |

| 0 | 0.2094306 | 0.2928932 | 0.2094306 | 0 |
|---|---|---|---|---|
| 0.2094306 | 0.5 | 0.6464466 | 0.5 | 0.2094306 |
| 0.2928932 | 0.6464466 | 1 | 0.6464466 | 0.2928932 |
| 0.2094306 | 0.5 | 0.6464466 | 0.5 | 0.0294306 |
| 0 | 0.2094306 | 0.2928932 | 0.2094306 | 0 |

FIG. 6A

| 0 | 0.2093987 | 0.2928486 | 0.2093987 | 0 |
|---|---|---|---|---|
| 0.2093987 | 0.4999238 | 0.6463482 | 0.4999238 | 0.2093987 |
| 0.2928486 | 0.6463482 | 0.9998477 | 0.6463482 | 0.2928486 |
| 0.2093987 | 0.499238 | 0.6463482 | 0.499238 | 0.2093987 |
| 0 | 0.2093987 | 0.2928486 | 0.2093987 | 0 |

FIG. 6B

| 0 | 0.209303 | 0.2927148 | 0.209303 | 0 |
|---|---|---|---|---|
| 0.209303 | 0.4996954 | 0.6460528 | 0.4996954 | 0.209303 |
| 0.2927148 | 0.6460528 | 0.9993908 | 0.6460528 | 0.2927148 |
| 0.209303 | 0.4996954 | 0.6460528 | 0.4996954 | 0.209303 |
| 0 | 0.209303 | 0.2927148 | 0.209303 | 0 |

METHOD FOR RECOGNIZING AND LOCATING OBJECT

FIELD OF THE INVENTION

The present invention relates to a method for recognizing and locating an object, and more particularly to a method for recognizing and locating an object in order to increase the recognizing accuracy and reducing the computational complexity.

BACKGROUND OF THE INVENTION

As known, the methods for recognizing and locating objects play very important roles in machine vision. Before the procedure of measuring and detecting the under-test material in the production line, it is necessary to recognize and locate the position of the under-test material in order to compensate the placement position error of the under-test material. Moreover, for gripping and assembling the material in the production line by a robot, it is necessary to recognize and locate the material.

In a conventional object identification and location method, a connected component analysis is employed. Firstly, a foreground of a binary image is obtained. Then, the axis length, the area, the perimeter or any other appropriate feature of the foreground is analyzed. Consequently, the object can be recognized. However, if the object has a broken part or a hidden part, the recognition rate of the connected component analysis is largely reduced. Moreover, if the change of the ambient light intensity is very obvious, it is difficult to segment the binary image of the object clearly.

Moreover, the sum of absolute differences (SAD) is an algorithm that is widely used to locate the object. This SAD algorithm does not need the binary operations. Moreover, if the concepts of a triangle inequality described by Salari, W. Li and E. are applied to the SAD algorithm, the amount of the data to be calculated is largely reduced. However, the SAD algorithm fails to overcome the problem caused by the linear light intensity variation. Recently, a normalized cross correlation (NCC) method described by Luigi Di Stefano, Stefano Mattoccia and Martino Mola can overcome the problem caused by the linear light intensity variation. Consequently, the NCC method becomes one of the most popular locating methods. However, if the object is hidden or a non-linear light intensity variation exists, the similarity score is largely reduced. Under this circumstance, an unstable location problem occurs.

The above conventional methods use pixels as the location features. Recently, a generalizing Hough transform (GHT) described by D. H. Ballard extracts edge points from a grayscale image. That is, the edge point is used as the geometric feature. The GHT method can overcome the problems of the non-linear light intensity variation and the hidden object. However, if the background of the image is complicate and the number of the non-edge parts of the object is huge, the votes for the location of the object produce many false positives. In other words, the detection result is unstable. Moreover, a chamfer transform described by Thayananthan, A., Stenger, B., Ton, P. H. S. and Cipolla, R. uses the edge points as the feature for location. The chamfer transform can accelerate the location of the object. However, if the object has a hidden part and many non-edge parts of the object are generated, the locating efficacy is impaired.

Therefore, there is a need of providing a method for effectively recognizing and locating an object in order to overcome the above drawbacks.

SUMMARY OF THE INVENTION

The present invention provides a method for recognizing and locating an object in a two-dimensional live image. Consequently, even if the object has a broken part or a hidden part and/or the background of the image is complicated and/or a non-linear light intensity variation exists, the object can be effectively recognized and located.

Another object of the present invention provides a method for recognizing and locating an object in order to increase the recognizing accuracy and reducing the calculating complexity.

In accordance with an aspect of the present invention, there is provided a method for recognizing and locating an object. The method includes an offline mode process and an online mode process. In the offline mode process, a template image of the object is analyzed to obtain plural sampled edge points of the template image and respective gradient angles and a gravity position of the plural sampled edge points, and plural similarity score tables are obtained according to the plural sampled edge points, a predetermined detecting distance range and a predetermined gradient angle difference range. In the online mode process, a live image is analyzed to obtained plural edge points of the live image and respective gradient angles of the plural sampled edge points, plural predictive gravity positions corresponding to the plural edge points of the live image are calculated, and plural similarity scores corresponding to the plural predictive gravity positions are calculated or summed up according to plural similarity scores of the plural similarity score tables. The predictive gravity position with the local maximum of the similarity scores higher than a threshold value is correlated with the gravity position of the template image so as to recognize and locate the object.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
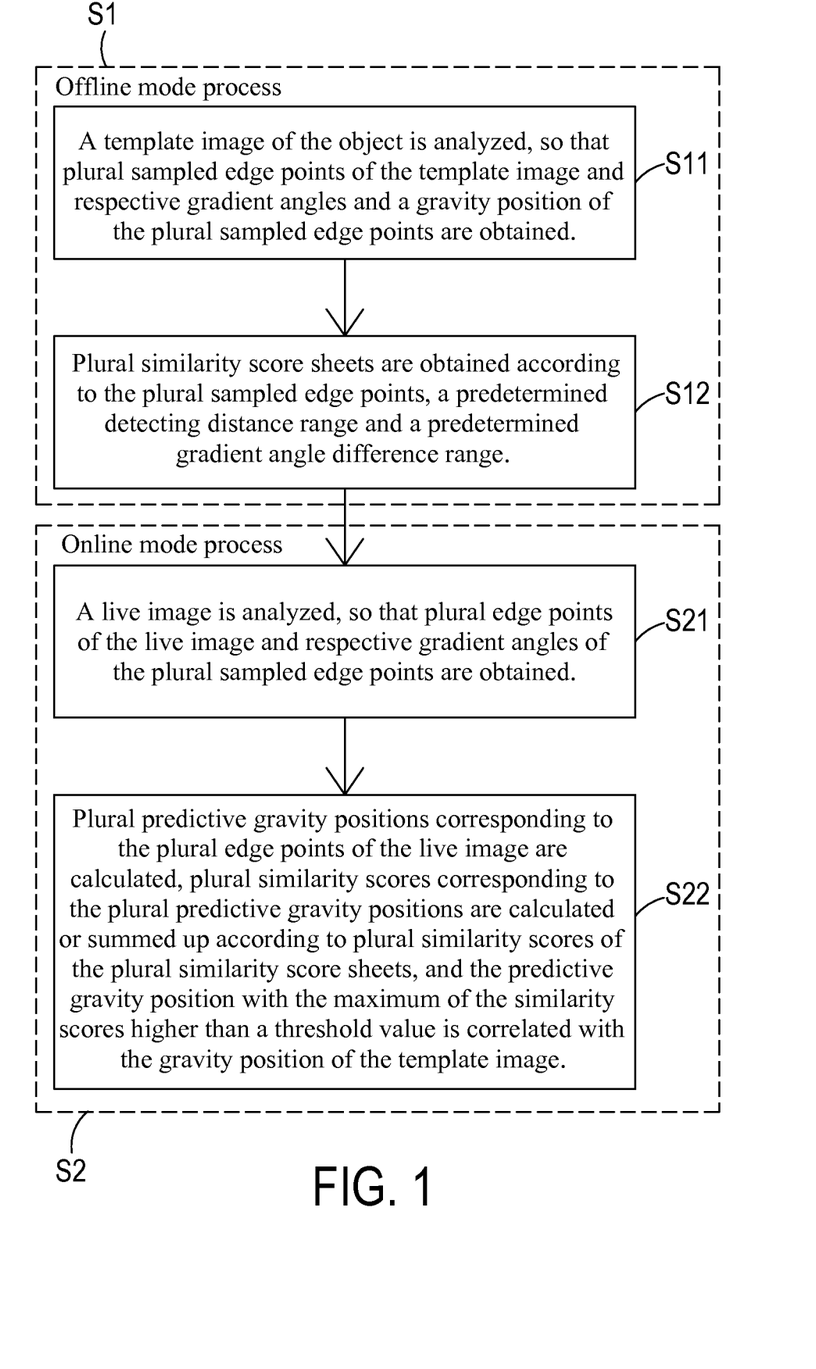
FIG. 1 is a flowchart illustrating a method for recognizing and locating an object according to an embodiment of the present invention.

FIG. 1 is a flowchart illustrating a method for recognizing and locating an object according to an embodiment of the present invention. The method of the present invention is capable of recognizing and locating a user-defined object in a two-dimensional live image. The method comprises an offline mode process S1 and an online mode process S2. The offline mode process S1 comprises the steps S11 and S12. In the step S11, an image of an object selected by the user is defined as a template image. After the template image of the object is analyzed, plural sampled edge points of the template image and respective gradient angles and a gravity position of the plural sampled edge points are obtained. In the step S12, plural similarity score tables are obtained according to the plural sampled edge points, a predetermined detecting distance range and a predetermined gradient angle difference range. After the offline mode process S1, the online mode process S2 is executed. The online mode process S2 comprises the steps S21 and S22. In the step S21, a live image is analyzed. Consequently, plural edge points of the live image and respective gradient angles of the plural sampled edge points are obtained. In the step S22, plural predictive gravity positions corresponding to the plural edge points of the live image are calculated, plural similarity scores corresponding to the plural predictive gravity positions are calculated or summed up according to plural similarity scores of the plural similarity score tables, and the predictive gravity position with the local maximum of the similarity scores higher than a threshold value is correlated with the gravity position of the template image. Consequently, the object is effectively recognized and located.

Figure 2:
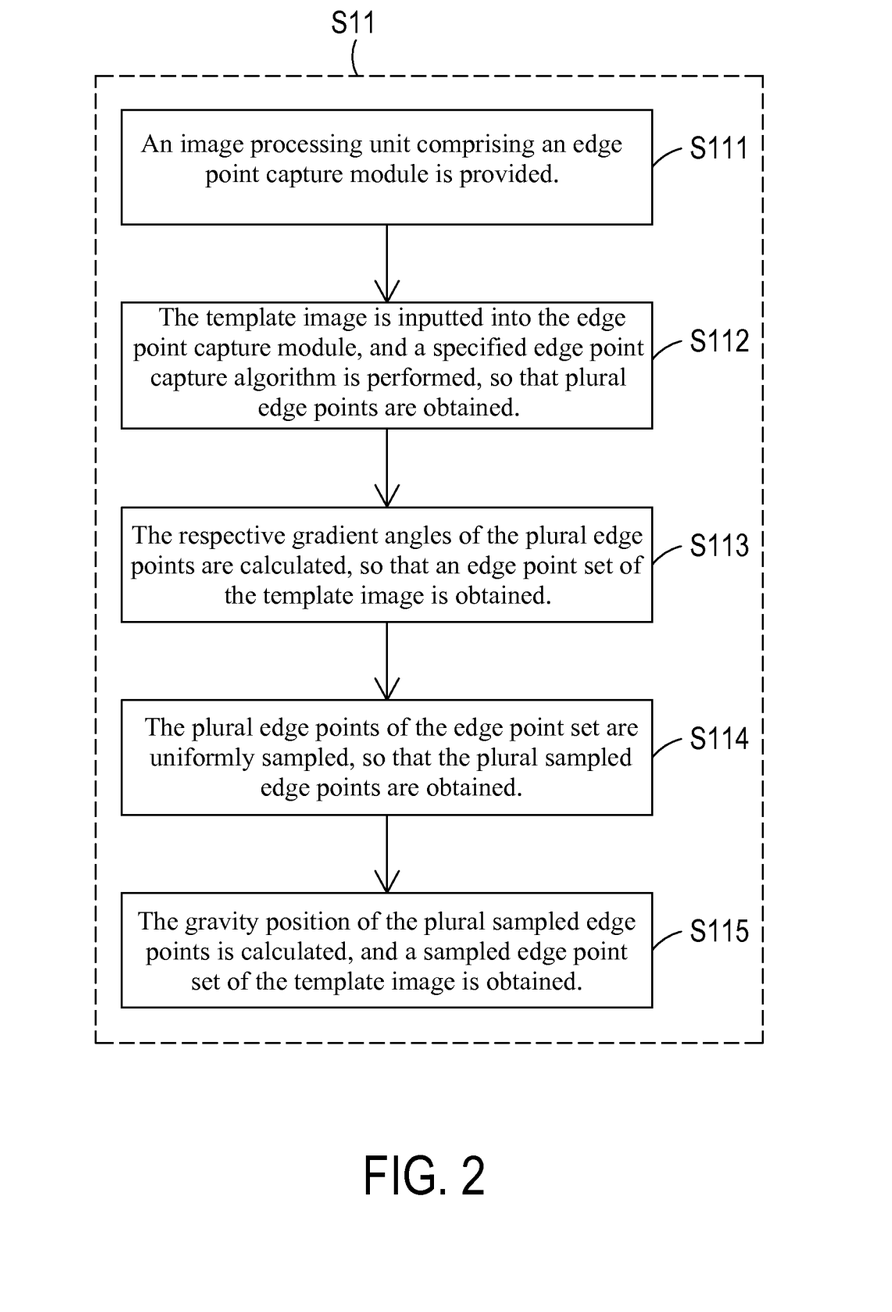
FIG. 2 is a flowchart illustrating the step S11 of the offline mode process S1 of the method for recognizing and locating an object according to the embodiment of the present invention.

FIG. 2 is a flowchart illustrating the step S11 of the offline mode process S1 of the method for recognizing and locating an object according to the embodiment of the present invention. The step S11 comprises the following sub-steps S111~S115. In the sub-step S111, an image processing unit comprising an edge point capture module is provided. Then, in the sub-step S112, a grayscale image (i.e. the template image) selected or defined by the user is inputted into the edge point capture module, and a specified edge point capture algorithm is performed by the edge point capture module. Consequently, the plural edge points (e.g. N edge points) of the template image are obtained, wherein N is a positive integer. An example of the specified edge point capture algorithm includes but is not limited to the Canny algorithm. The Canny algorithm is well known to those skilled in the art, and is not redundantly described herein. Then, in the sub-step S113, the respective gradient angles of the plural edge points are calculated, so that an edge point set E of the template image is obtained. Then, in the sub-step S114, the plural edge points of the edge point set E are uniformly sampled. Consequently, plural sampled edge points (e.g. M sampled edge points) are obtained, wherein M is a positive integer and M is smaller than N. The uniform sampling technology is well known to those skilled in the art, and is not redundantly described herein. Then, in the sub-step S115, the gravity position (i.e. a center of a mass) of the plural sampled edge points (i.e. the M sampled edge points) is calculated, and the distances between the plural sampled edge points and the gravity position and the gradient angles are recorded. Consequently, a sampled edge point set F of the template image is obtained.

Figure 3A:
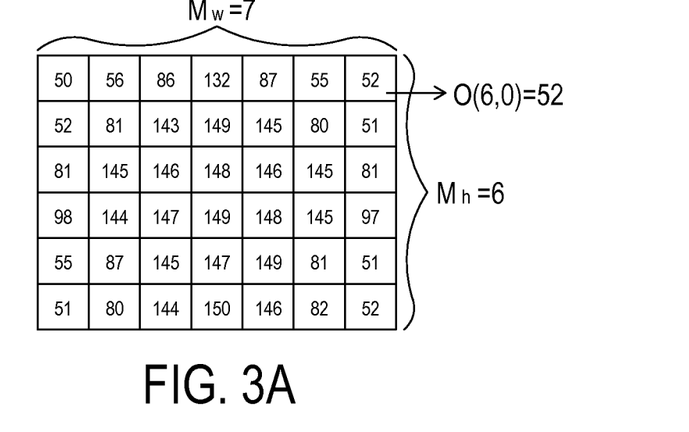
FIGS. 3A, 3B and 3C schematically illustrate an implementation example of the step S11 of the offline mode process S1 of the method for recognizing and locating an object according to the embodiment of the present invention.
Figure 3B:
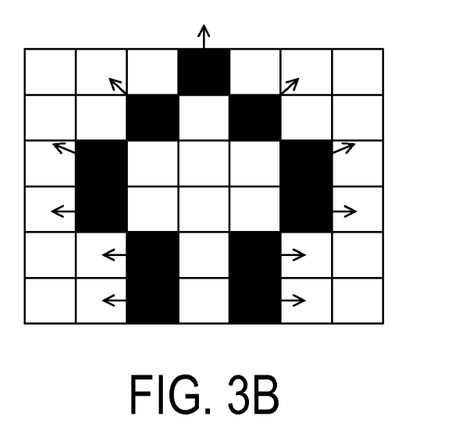
Figure 3C:
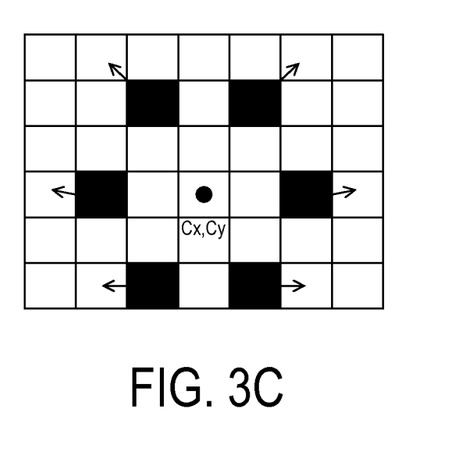

FIGS. 3A, 3B and 3C schematically illustrate an implementation example of the step S11 of the offline mode process S1 of the method for recognizing and locating an object according to the embodiment of the present invention. Please refer to FIGS. 2 and 3A. In the sub-step S112, the template image inputted into the edge point capture module is O(x,y), wherein (x,y) is a pixel value. Generally, the pixel value (x,y) is in the range between 0 and 255. Moreover, x is in the range between 0 and $M_{w-1}$, and y is in the range between 0 and $M_{h-1}$, wherein $M_w$ and $M_h$ are the length and the width of the template image, respectively. In this embodiment, $M_w$ is 7 and $M_h$ is 6. Please refer to FIG. 3B. In the sub-step S113, the captured edge point set E is $\{x_i, y_i, g_i | i=0\sim N-1\}$. In the edge point set E, N is the number of the edge points, $(x_i, y_i)$ is the coordinate of each edge point, $g_i$ is the gradient angle of each edge point. Moreover, the gradient angle g is expressed as $g=\arctan(M_y/M_x)$ and indicated as degree, which is rounded to the nearest whole number. In the above formula, $M_x$ is the differential of the edge point at the X direction, and $M_y$ is the differential of the edge point at the Y direction. Moreover, the gradient angle may be obtained according to a Sobel operator. The technology of obtaining the gradient angle according to a Sobel operator is well known to those skilled in the art, and is not redundantly described herein. Please refer to FIG. 3C. In the sub-steps S114 and S115, the gravity position of the M sampled edge points of the template image is $(C_x, C_y)$. For example, the gravity position $(C_x, C_y)$ of the template image is expressed as:

$$C_x = \frac{\sum_{i=0}^{M-1} x_i}{M} \text{ and } C_y = \frac{\sum_{y=0}^{M-1} y_i}{M}.$$

Moreover, the distance between each edge point $(x_i, y_i)$ and the gravity position $(C_x, C_y)$ is expressed as: $dx_i = x_i - C_x$, and $dy_i = y_i - C_y$. Afterwards, the sampled edge point set F of the template image is obtained. In this embodiment, the sampled edge point set F is $F = \{x_i, y_i, g_i | i=0\sim M-1\}$.

Figure 4:
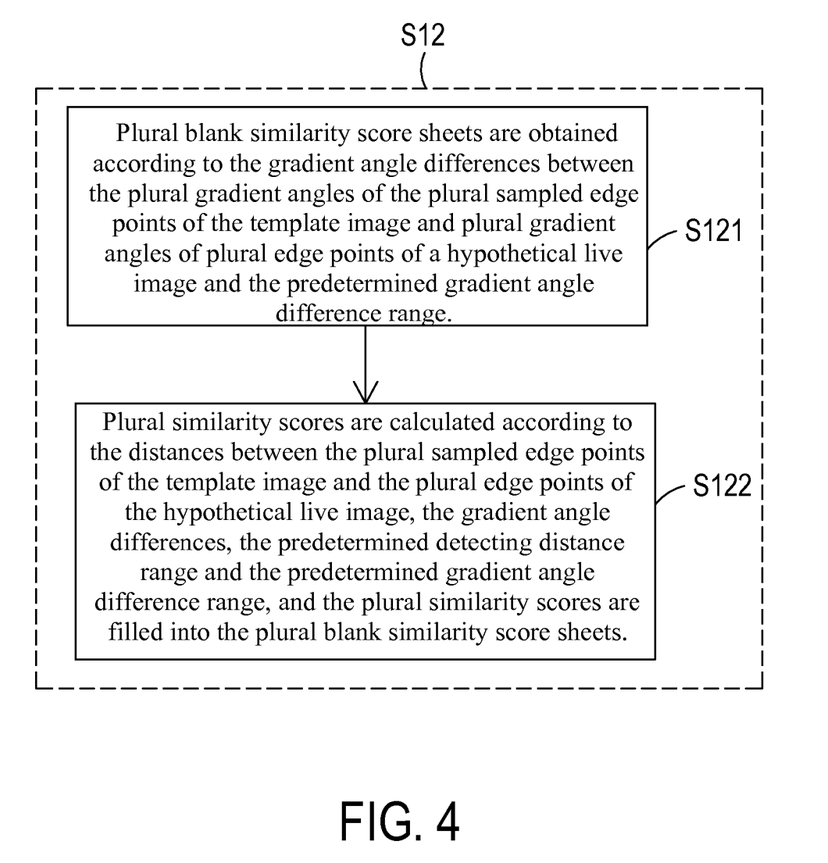
FIG. 4 is a flowchart illustrating the step S12 of the offline mode process S1 of the method for recognizing and locating an object according to the embodiment of the present invention.

FIG. 4 is a flowchart illustrating the step S12 of the offline mode process S1 of the method for recognizing and locating an object according to the embodiment of the present invention. The step S12 comprises the following sub-steps S121 and S112. In the sub-step S121, plural blank similarity score tables are obtained according to the gradient angle differences between the plural gradient angles of the plural sampled edge points of the template image and plural gradient angles of plural edge points of a hypothetical live image and the predetermined gradient angle difference range. Then, in the sub-step S122, plural similarity scores are calculated according to the distances between the plural sampled edge points of the template image and the plural edge points of the hypothetical live image, the gradient angle differences, the predetermined detecting distance range and the predetermined gradient angle difference range, and the plural similarity scores are filled into the plural blank similarity score tables. Consequently, the plural similarity score tables $J_{psf}$ are obtained. In this embodiment, the predetermined detecting distance range and the predetermined gradient angle difference range are adjustable parameters that are set by the user according to the practical requirements.

For example, the edge point set of the hypothetical live image may be expressed as: $S=\{x_j, y_j, g_j | j=0 \sim P-1\}$. In the edge point set S, $(x_i, y_i)$ is the coordinate of each edge point of the hypothetical live image, $g_i$ is the gradient angle of each edge point of the hypothetical live image, and P is the number of edge points of the hypothetical live image. Moreover, x is in the range between 0 and $S_{w-1}$, and y is in the range between 0 and $S_{h-1}$, wherein $S_w$ and $S_h$ are the length and the width of the grayscale image of the hypothetical live image, respectively.

Moreover, the summation of plural similarity scores corresponding to plural predictive gravity positions C may be calculated according to the following formulae:

$$C(u,v) = \sum_{i=0}^{M-1} \text{Max}\{J(dx_i, dy_i, g_i, x_j, y_j, g_j) | (x_j, y_j, g_j) \in H_i\} \quad (1)$$

$$J(u, v, dx_i, dy_i, g_i, x_j, y_j, g_j) = \quad (2)$$

$$\frac{\sqrt{2}R - \sqrt{(dx_i + u - x_j)^2 + (dy_i + v - y_j)^2}}{\sqrt{2}R} \cos(g_i - g_j)$$

$$H_i = \{(x_j, y_j, g_j) | (x_j, y_j, g_j) \in S, \quad (3)$$
$$j = 0 \sim P-1, dx_i + u - R \leq x_j \leq dx_i + u + R,$$
$$dy_i + v - R \leq y_j < dy_i + v + R | g_i - g_j | < T\}$$

Figure 5:
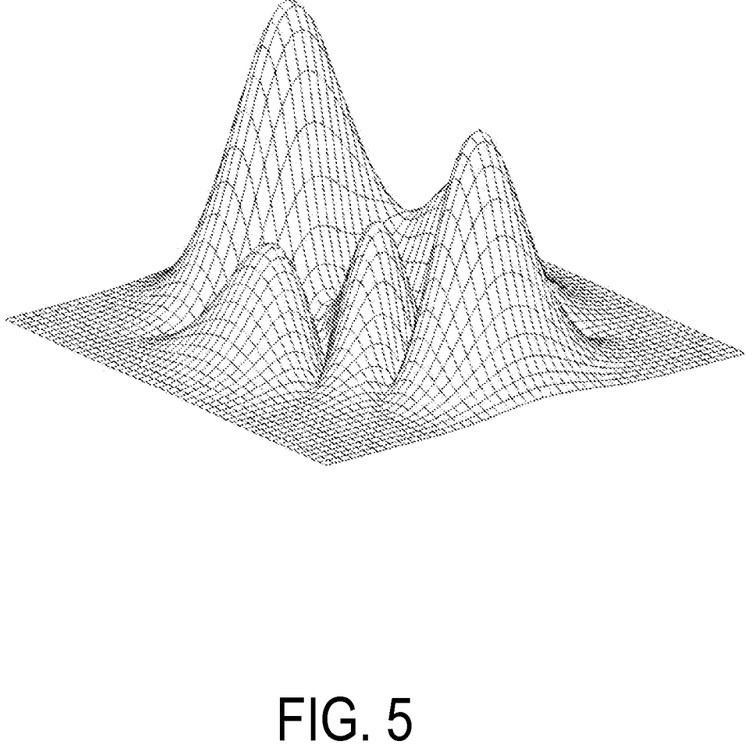
FIG. 5 is a schematic 3D contour diagram illustrating the distribution of the similarity scores corresponding to plural predictive gravity positions.

The formula (1) is used to calculate the summation of the plural similarity scores corresponding to plural predictive gravity positions C. The distribution of the similarity scores corresponding to the plural predictive gravity positions are shown in FIG. 5. The local maximum of the similarity scores which are higher than a threshold value indicates the position of the under-test object. The formula (2) is used to calculate the similarity scores according to the distances between the plural sampled edge points of the template image and the plural edge points of the hypothetical live image and the gradient angle differences. Moreover, R is the predetermined detecting distance range, and T is the predetermined gradient angle difference range. As known, if the distribution of the similarity scores is based on all possible predictive gravity positions, the amount of the processed data is very huge. In accordance with the present invention, the distribution of the similarity scores corresponding to the plural predictive gravity positions is determined according to the distances between the plural sampled edge points of the template image and the plural edge points of the hypothetical live image and the gradient angle differences. Consequently, the amount of the processed data is largely reduced.

The above formulae (1)~(3) have the following meanings. If the gravity position of the template image has the coordinate (u,v), the shortest distance and the lowest gradient angle difference between each sampled edge point of the template image and the edge points of an edge point subset of the hypothetical live image will be searched. That is, the edge points of the edge point subset are within the diameter R, and the gradient angle differences between each sampled edge point of the template image and the edge points of the edge point subset are smaller than or equal to T degrees. In addition to the shortest distance, the gradient angle is also included in the definition and the calculation of the similarity score. Consequently, the efficacy of recognizing the object is enhanced according to the present invention.

Figure 6A:
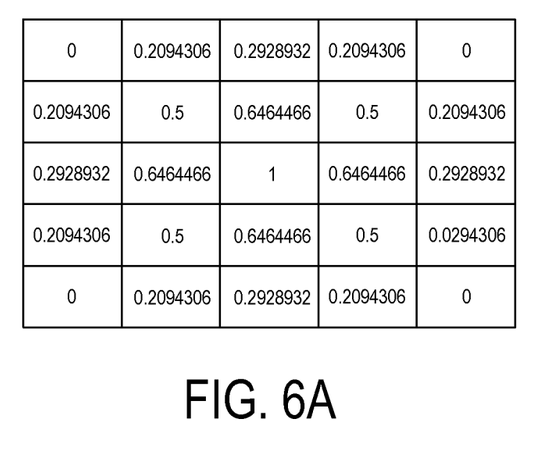
FIGS. 6A, 6B and 6C schematically illustrate three similarity score tables obtained by the method for recognizing and locating an object according to the embodiment of the present invention.

For example, if R=2 and T=2, the gradient angle difference between each sampled edge point of the template image and the edge points of the hypothetical live image are possibly 0, 1 or 2. That is, $|g_i - g_j|=0$, 1 or 2. If the gradient angle difference $|gi-gj|=0$, the similarity score table $J_{psf0}$ as shown in FIG. 6A is obtained. The similarity scores of all position of the similarity score table $J_{psf0}$ may be calculated according to the above formula (2). In the formula (2), the distance between the sampled edge point of the template image and the selected edge point of the hypothetical live image may be calculated according to the following term:

$$\sqrt{(dx_i + v - x_j)^2 + (dy_i + v - y_j)^2}$$

Since R and T are known and the coordinates and the gradient angles of the edge points are known, the resultant values of the formula (2) can be obtained in the offline mode process and stored in the similarity score table. For example, the center position of the similarity score table indicates that distances between the sampled edge point of the template image and the selected edge point of the hypothetical live image along the X direction and the Y direction are both zero. Consequently, the following results may be calculated.

$$Jpsf0(0,0) = \frac{2\sqrt{2} - \sqrt{2^2 + 2^2}}{2\sqrt{2}} \cos(0) = 0$$

$$Jpsf\,0(1,0) = \frac{2\sqrt{2} - \sqrt{1^2 + 2^2}}{2\sqrt{2}} \cos(0) = 0.2094306$$

The rest may be deduced by analogy.

Figure 6B:
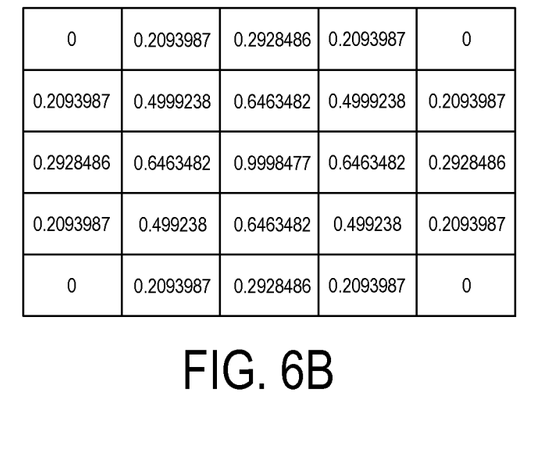
Figure 6C:
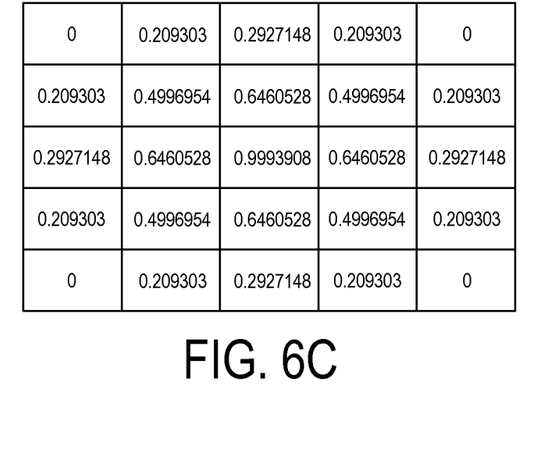

Moreover, if the gradient angle difference $|gi-gj|=1$, the similarity score table $J_{psf1}$ as shown in FIG. 6B is obtained. Moreover, if the gradient angle difference $|gi-gj|=2$, the similarity score table $J_{psf2}$ as shown in FIG. 6C is obtained.

Figure 7:
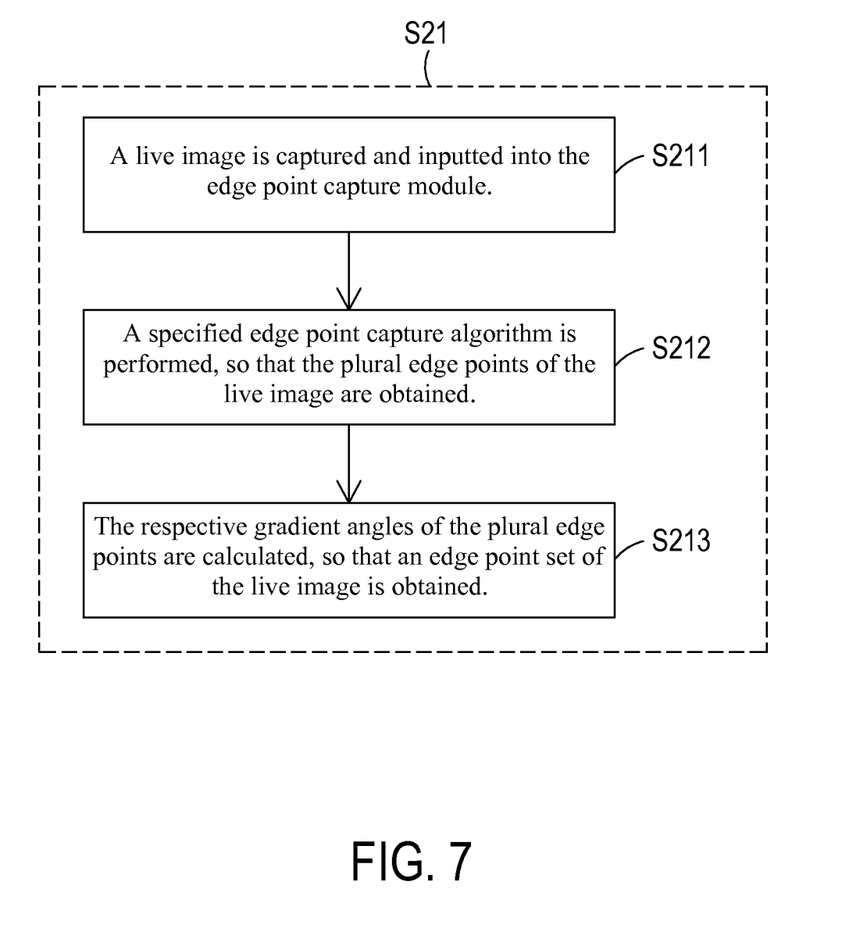
FIG. 7 is a flowchart illustrating the step S21 of the online mode process S2 of the method for recognizing and locating an object according to the embodiment of the present invention.

FIG. 7 is a flowchart illustrating the step S21 of the online mode process S2 of the method for recognizing and locating an object according to the embodiment of the present invention. The step S21 comprises the following sub-steps S211~S213. In the sub-step S211, an image capture device is provided to capture a live image, and the live image is transmitted to the edge point capture module of the image processing unit. Then, in the sub-step S212, a grayscale image of the live image is inputted into the edge point capture module, and a specified edge point capture algorithm is performed by the edge point capture module. Consequently, plural edge points (e.g. P edge points) of the live image are obtained, wherein P is a positive integer. An example of the specified edge point capture algorithm includes but is not limited to the Canny algorithm. Then, in the sub-step S213, the respective gradient angles of the plural edge points are calculated, so that an edge point set of the live image is obtained. The captured edge point set of the live image is equivalent to the edge point set of the above hypothetical live image. That is, the edge point set of the live image may be expressed as: $S=\{x_j, y_j, g_j | j=0 \sim P-1\}$. In the edge point set S, $(x_i, y_i)$ is the coordinate of each edge point, and $g_i$ is the gradient angle of each edge point. Moreover, x is in the range between 0 and $S_{w-1}$, and y is in the range between 0 and $S_{h-1}$, wherein $S_w$ and $S_h$ are the length and the width of the grayscale image of the live image, respectively. Moreover, the gradient angle g is expressed as g=arctan($M_y/M_x$) and indicated as degree, which is rounded to the nearest whole number. In the above formula, $M_x$ is the differential of the edge point at the X direction, and $M_y$ is the differential of the edge point at the Y direction. Moreover, the gradient angle may be obtained according to a Sobel operator.

Figure 8:
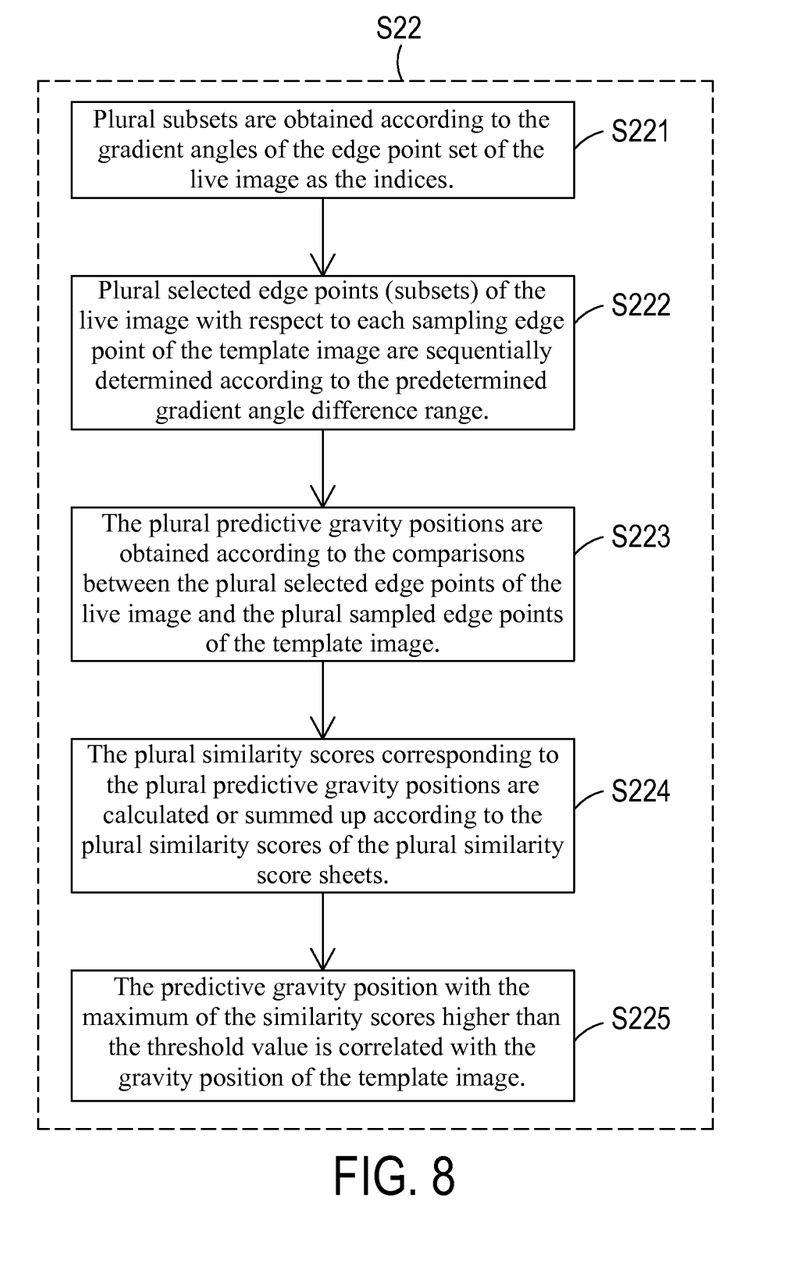
FIG. 8 is a flowchart illustrating the step S22 of the online mode process S2 of the method for recognizing and locating an object according to the embodiment of the present invention.

FIG. 8 is a flowchart illustrating the step S22 of the online mode process S2 of the method for recognizing and locating an object according to the embodiment of the present invention. The step S22 comprises the following sub-steps S221~S225. In the sub-step S221, 360 subsets are obtained according to the gradient angles of the edge point set S of the live image as the indices. These 360 subsets are expressed as the following formulae:

$$S_0 = \{(x_j, y_j, g_j) | (x_j, y_j, g_j) \in S, j=0 \sim P-1, g_j=0\}, \quad (4)$$

$$S_1 = \{(x_j, y_j, g_j) | (x_j, y_j, g_j) \in S, j=0 \sim P-1, g_j=1\} \quad (5)$$

$$S_{359} = \{(x_j, y_j, g_j) | (x_j, y_j, g_j) \in S, j=0 \sim P-1, g_j=0\}, \quad (6)$$

Then, in the sub-step S222, plural selected edge points K of the live image with respect to each sampling edge point of the template image are sequentially determined according to the predetermined gradient angle difference range. The selected edge points K is the subset of the edge points of the live image. That is, $K=\{S_k \| k - g_i | \leq T\}$, wherein "i" is the index of the sequentially-processed sampled edge points of the template image. For clarification and brevity, the subset of the edge points of the live image are referred as the selected edge points K. Before the edge points of the template image are sequentially processed, two two-dimensional matrices $V_{prev}$ and V are generated. The contents of the two-dimensional matrices $V_{prev}$ and V are set as zero. The sizes of the two-dimensional matrices $V_{prev}$ and V are $(S_w, S_h)$. The two-dimensional matrix V is a similarity score matrix added to the i-th edge point of the template image, and the two-dimensional matrix $V_{prev}$ is a similarity score matrix added to the (i−1)-th edge point of the template image. For example, R=2 and T=2. While the sampled edge point F of the template image is processed and the i-th edge point ($dx_i, dy_i, g_i$) of the template image is summed up (e.g. $g_i$=45), five selected subsets S43, S44, S45, S46 and S47 are selected. Since the gradient angle differences of the edge points of the subsets S43 and S47 are 2 degrees, the similarity score table $J_{psf2}$ is used to sum up the similarity scores. Since the gradient angle differences of the edge points of the subsets S44 and S46 are 1 degree, the similarity score table $J_{psf1}$ is used to sum up the similarity scores. Since the gradient angle difference of the edge points of the subset S45 is 0 degree, the similarity score table $J_{psf0}$ is used to sum up the similarity scores. Then, in the sub-step S223, the plural predictive gravity positions G are obtained according to the comparisons between the plural selected edge points of the live image and the plural sampled edge points of the template image.

Figure 12:
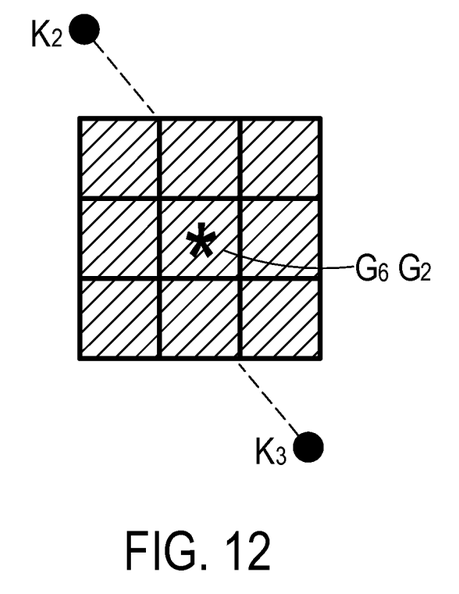

Then, in the sub-step S224, the plural similarity scores corresponding to the plural predictive gravity positions G are calculated or summed up according to the plural similarity scores of the plural similarity score tables. If two of the predictive gravity positions G have plural identical similarity scores J corresponding to plural similarity score table $J_{psf}$, it is necessary to judge whether the two predictive gravity positions G are obtained by using the same sampled edge point F as the reference point. If the two predictive gravity position G are obtained by using the same sampled edge point F as the reference point, the similarity scores of the selected edge points are replaced by merit. That is, the higher similarity scores of the plural similarity score tables $J_{psf}$ corresponding to the two predictive gravity positions G are determined as the similarity scores of the two predictive gravity positions G. On the other hand, if the two predictive gravity positions G are obtained by using different sampled edge points F as the reference points, the similarity scores of the selected edge points are summed up. That is, the similarity scores of the plural similarity score tables $J_{psf}$ corresponding to the two predictive gravity positions G are summed up. Consequently, the similarity score J of the corresponding predictive gravity position G is the summation similarity score. For example, in the five selected subsets S43, S44, S45, S46 and S47, if the edge points (xj,yj) of the selected subset is overlapped with the edge point ($dx_i, dy_i$) of the template image, the gravity position ($x_j - dx_i, dy_i - y_j$) of the object is the predictive gravity position G. Consequently, the similarity score table $J_{psf}$ is added to the two-dimensional matrix V according to the following formulas (see also FIG. 12):

$$\forall p, q \in Z : |p| \leq R, |q| \leq R$$
$$v = V(x_j - dx_i + p, y_j - dy_i + q)$$
$$v_p = V_{prev}(x_j - dx_i + p, y_j - dy_i + q) + J_{psf}(R+p, R+q)$$
$$v = \begin{cases} v_p, & v_p > v \\ v, & v_p \leq v \end{cases}$$

In other words, the above formulae indicate a replacing process rather than an unconditional cumulative process. That is, in each element of the two-dimensional matrix V, only one best (xj,yj) contributes the score to each edge point ($dx_i, dy_i$). Consequently, the problem of generating many false positives will be overcome. Even if the background of the image is complicated, the identification rate is acceptable. Moreover, the output result of the two-dimensional matrix V is equivalent to the similarity scores. If the edge points ($dx_i, dy_i$) are different, the similarity scores are cumulated. Consequently, the accuracy of determining the predictive gravity position G is enhanced according to the cumulative similarity scores of different edge points ($dx_i, dy_i$).

Afterwards, in the sub-step S225, the predictive gravity position G with the local maximum of the similarity scores higher than a threshold value is correlated with the gravity position of the template image. Consequently, the object is effectively recognized and located. In this embodiment, the threshold value is set by the user and adjustable according to the practical requirements.

Figure 9:
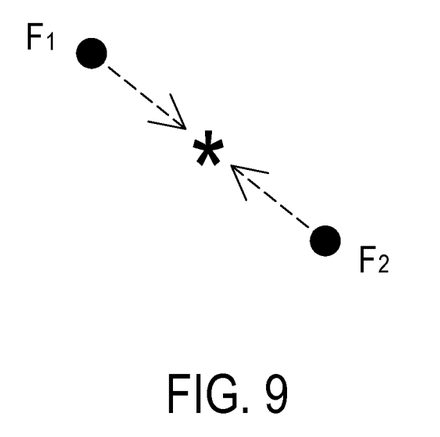
FIGS. 9, 10, 11 and 12 schematically illustrate an implementation example of the step S22 of the online mode process S2 of the method for recognizing and locating an object according to the embodiment of the present invention.
Figure 10:
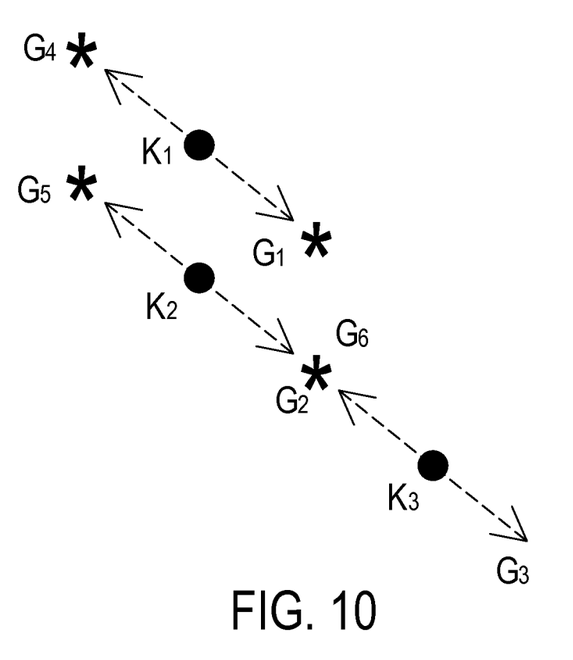

FIGS. 9, 10, 11 and 12 schematically illustrate an implementation example of the step S22 of the online mode process S2 of the method for recognizing and locating an object according to the embodiment of the present invention. As shown in FIG. 9, the template image has two sampled edge points $F_1$ and $F_2$. As shown in FIG. 10, the live image has three selected edge points $K_1$, $K_2$ and $K_3$. In case that the sampled edge point $F_1$ of the template image is served as a reference point, the predictive gravity positions $G_1$, $G_2$ and $G_3$ corresponding to the selected edge points $K_1$, $K_2$ and $K_3$ of the live image may be obtained according to the relationship between the gravity position of the template image and the sampled edge point $F_1$. In case that the sampled edge point $F_2$ of the template image is served as the reference point, the predictive gravity positions $G_4$, $G_5$ and $G_6$ corresponding to the selected edge points $K_1$, $K_2$ and $K_3$ of the live image may be obtained according to the relationship between the gravity position of the template image and the sampled edge point $F_2$. In other words, the grayscale image of the live image contains the plural predictive gravity positions $G_1, G_2, G_3, G_4, G_5$ and $G_6$. For example, if the gradient angle differences between the sampled edge point $F_1$ of the template image and the selected edge points $K_1, K_2$ and $K_3$ of the live image are 1, 1 and 2, the similarity scores of the selected edge points $K_1, K_2$ and $K_3$ of the live image corresponding to the sampled edge point $F_1$ of the template image are filled into the similarity score tables $J_{psf1}, J_{psf1}$ and $J_{psf2}$, respectively. Moreover, if the gradient angle differences between the sampled edge point $F_2$ of the template image and the selected edge points $K_1, K_2$ and $K_3$ of the live image are 0, 1 and 0, the similarity scores of the selected edge points $K_1, K_2$ and $K_3$ of the live image corresponding to the sampled edge point $F_2$ of the template image are filled into the similarity score tables $J_{psf0}, J_{psf1}$ and $J_{psf0}$, respectively.

Figure 11:
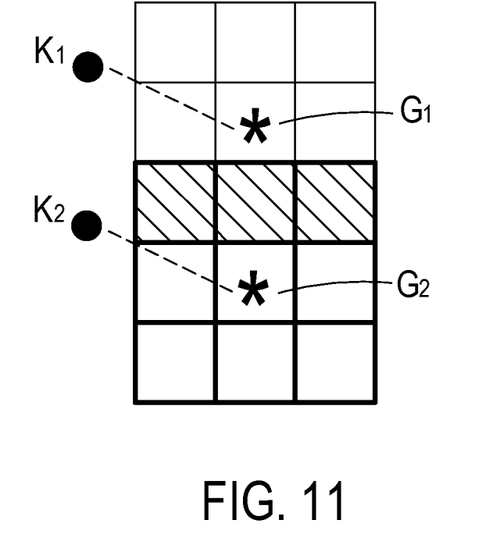

As shown in FIG. 11, the predictive gravity positions $G_1$ and $G_2$ are not overlapped. However, after the similarity score of the predictive gravity position $G_1$ is inputted into the similarity score table $J_{psf1}$ and the similarity score of the predictive gravity position $G_2$ is inputted into the similarity score table $J_{psf1}$, a portion of the similarity score table $J_{psf1}$ corresponding to the predictive gravity position $G_1$ and a portion of the similarity score table $J_{psf1}$ corresponding to the predictive gravity position $G_2$ are overlapped. As shown in FIG. 11, the region marked by oblique lines is the overlapped portion. The similarity scores of the overlapped portion are the similarity scores of the selected edge points $K_1$ and $K_2$ of the live image corresponding to the sampled edge point $F_1$ of the template image. Moreover, the predictive gravity positions $G_1$ and $G_2$ corresponding to the selected edge points $K_1$ and $K_2$ are obtained by using the sampled edge point $F_1$ as the reference point. Under this circumstance, the similarity scores of the selected edge points in the overlapped portion are replaced by merit. That is, the higher similarity scores of the selected edge points in the overlapped portion are determined as the similarity scores of the selected edge points.

As shown in FIG. 12, the predictive gravity positions $G_2$ and $G_6$ are overlapped. Consequently, after the similarity score of the predictive gravity position $G_2$ is inputted into the similarity score table $J_{psf2}$ and the similarity score of the predictive gravity position $G_6$ is inputted into the similarity score table $J_{psf0}$, the similarity score table $J_{psf2}$ corresponding to the predictive gravity position $G_2$ and the similarity score table $J_{psf0}$ corresponding to the predictive gravity position $G_6$ are completely overlapped. As shown in FIG. 12, the region marked by oblique lines is the overlapped portion. However, these two similarity score tables are obtained according to different reference points, and the predictive gravity positions $G_2$ and $G_6$ are obtained according to different reference points. That is, the predictive gravity position $G_2$ corresponding to the selected edge point $K_2$ is obtained by using the sampled edge point $F_1$ as the reference point, and the predictive gravity position $G_6$ corresponding to the selected edge point $K_3$ is obtained by using the sampled edge point $F_2$ as the reference point. In this situation, the summations of the similarity scores of the selected edge points of the two similarity score tables are determined as the similarity scores of the selected edge points. Consequently, the problem of generating many false positives will be overcome and the detecting result is more stable. Afterwards, the predictive gravity position with the local maximum of the similarity scores higher than a threshold value is correlated with the gravity position of the template image. Consequently, the object is effectively recognized and located.

From the above descriptions, the present invention provides a method for recognizing and locating an object. In accordance with the method of the present invention, the edge points and the gradient angles of the edge points are used as the features for location. Moreover, the similarity scores for recognizing and locating the object are calculated according to the distances and the gradient angle differences between the plural sampled edge points of the template image and the plural edge points of the live image. Consequently, even if the object has a broken part or a hidden part and/or the background of the image is complicated and/or a non-linear light intensity variation exists, the object can be effectively recognized and located. Moreover, the accuracy of recognizing and locating the object will be largely enhanced and the problem of generating many false positives will be overcome. That is, the detecting result is more stable. Moreover, as previously described, the conventional object recognition and location technology calculates the similarity scores according to all possible predictive gravity positions. Consequently, the computational complexity of the conventional object recognition and location technology is equal to $S_w \times S_h \times M \times (2R+1)^2$. In accordance with the method of the present invention, the plural predictive gravity positions are calculated according to comparisons between the plural selected edge points of the live image and the plural sampled edge points of the template image. Consequently, the computational complexity is reduced to $P \times M \times (2R+1)^2$. Since the number P of the edge points of the live image is much smaller than the number of pixels of the live image, the method of the present invention can effectively enhance the recognition rate and largely reduce the computational complexity.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for recognizing and locating an object, the method comprising:
    performing an offline mode process comprising steps of:
    (a) analyzing a template image of the object, so that plural sampled edge points of the template image and respective gradient angles and a gravity position of the plural sampled edge points are obtained; and
    (b) obtaining plural similarity score tables according to the plural sampled edge points, a predetermined detecting distance range and a predetermined gradient angle difference range;
    performing an online mode process comprising steps of:
    (c) analyzing a live image, so that plural edge points of the live image and respective gradient angles of the plural edge points are obtained; and
    (d) calculating plural predictive gravity positions corresponding to the plural edge points of the live image, and calculating or summing up plural similarity scores corresponding to the plural predictive gravity positions according to plural similarity scores of the plural similarity score tables, wherein the predictive gravity position with the similarity scores higher than a threshold value is correlated with the gravity position of the template image, thereby recognizing and locating the object.

2. The method according to claim 1, wherein the step (a) further comprises sub-steps of:

(a1) inputting a grayscale image of the template image, and performing a specified edge point capture algorithm, so that plural edge points of the template image are obtained;
(a2) calculating the respective gradient angles of the plural edge points;
(a3) uniformly sampling the plural edge points of the edge point set, so that the plural sampled edge points are obtained; and
(a4) calculating the gravity position of the plural sampled edge points, and a sampled edge point set of the template image is obtained.

3. The method according to claim 1, wherein the step (b) comprises sub-steps of:
(b1) obtaining plural blank similarity score tables according to the plural sampled edge points and the predetermined gradient angle difference range; and
(b2) calculating plural similarity scores according to the plural sampled edge points, the predetermined detecting distance range and the predetermined gradient angle difference range, and filling the plural similarity scores into the plural blank similarity score tables, so that the plural similarity score tables are obtained.

4. The method according to claim 1, wherein the predetermined detecting distance range and the predetermined gradient angle difference range are adjustable parameters.

5. The method according to claim 1, wherein the step (c) comprises sub-steps of:
(c1) inputting a grayscale image of the live image, and performing a specified edge point capture algorithm, so that the plural edge points of the live image are obtained; and
(c2) calculating the respective gradient angles of the plural edge points according to the plural edge points of the live image.

6. The method according to claim 1, wherein the step (d) further comprises a sub-step (d1) of determining plural selected edge points of the live image according to the predetermined gradient angle difference range.

7. The method according to claim 6, wherein in the step (d1), if plural gradient angle differences between the plural edge points of the live image and the plural sampled edge points of the template image are smaller than or equal to the predetermined gradient angle difference range, the plural edge points of the live image are treated as the plural selected edge points of the live image.

8. The method according to claim 6, wherein after the sub-step (d1), the step (d) further comprises a sub-step (d2) of obtaining the plural predictive gravity positions according to comparisons between the plural selected edge points of the live image and the plural sampled edge points of the template image.

9. The method according to claim 8, wherein after the sub-step (d2), the step (d) further comprises a sub-step (d3) of selecting the similarity score tables corresponding to the plural predictive gravity positions according to the plural gradient angle differences between the plural selected edge points of the live image and the plural sampled edge points of the template image.

10. The method according to claim 9, wherein after the sub-step (d3), the step (d) further comprises a sub-step (d4) of calculating the plural similarity scores corresponding to the plural predictive gravity positions according to the corresponding similarity score tables.

11. The method according to claim 10, wherein in the sub-step (d4), when the plural similarity scores corresponding to the plural predictive gravity positions are calculated and if two of the plural predictive gravity positions have plural identical similarity scores corresponding to plural similarity score tables, a method of calculating the plural similarity scores is determined according to whether the two predictive gravity positions are obtained by using the same sampled edge point as a reference point.

12. The method according to claim 11, wherein in the sub-step (d4), if the two predictive gravity positions are obtained by using the same sampled edge point as the reference point, the similarity scores of the selected edge points are replaced by merit and the higher similarity scores of the plural similarity score tables corresponding to the predictive gravity positions are determined as the similarity score of respective predictive gravity positions.

13. The method according to claim 11, wherein in the sub-step (d4), if the two predictive gravity positions are obtained by using the different sampled edge points as the reference point, the similarity scores of the plural similarity score tables corresponding to the predictive gravity positions are summed up and determined as the similarity scores of the predictive gravity positions.

14. The method according to claim 1, wherein the threshold value is set and adjustable by a user, and the predictive gravity position with a local maximum of the similarity scores higher than a threshold value is correlated with the gravity position of the template image.

* * * * *